United States Patent Office 3,467,605
Patented Sept. 16, 1969

3,467,605
HIGH DENSITY RIGID POLYETHER/POLYESTER URETHANE FOAMS
Lawrence W. Abercrombie, Meriden, Nabil N. Saaty, Hamden, and Adnan A. R. Sayigh, North Haven, Conn., assignors to The Upjohn Company, Kalamazoo, Mich., a corporation of Delaware
No Drawing. Filed July 21, 1966, Ser. No. 566,748
Int. Cl. C08g 22/44, 22/10
U.S. Cl. 260—2.5   2 Claims

ABSTRACT OF THE DISCLOSURE

High density (30 to 50 p.c.f.) rigid polyurethane foams, useful in the preparation of shoe lasts, bowling balls, and the like, are prepared by reacting, under foam producing conditions, (i) methylenebis(phenyl isocyanate) or a polymethylene polyphenyl polyisocyanate containing 35 to 85 percent of the diisocyanate, (ii) a polyether polyol of functionality 3 to 8 and equivalent weight of 50 to 200 and (iii) a polyester diol of equivalent weight 75 to 600. Proportions of (ii) and (iii) are chosen so that the overall average functionality is 2.5 to 3.5 and overall combined equivalent weight is 100 to 175. The overall NCO/OH is 0.9:1.0 to 1.2:1.0.

---

This invention relates to novel polyurethane compositions and is more particularly concerned with novel high density rigid polyurethane foams and with processes for their preparation.

Rigid polyurethane foams having a high density, i.e. a density ranging from about 30 pounds per cu. ft. to about 50 pounds per cu. ft. or even higher, are well-known in the art. A variety of uses of such materials has been developed in which the high density rigid polyurethane foam has been employed to replace a more traditional material such as brick, stone, wood and the like. In such cases the polyurethane usually exhibits all the desirable properties of the material which it replaces and has the additional advantage of greater resistance to erosion, atmospheric degradation, biological attack etc. compared with the original material.

One area in which the replacement of traditional materials by polyurethane has not hitherto been accomplished successfully is in the formation of shoe lasts and like forms employed in the molding and finishing of leather. Shoe lasts and related forms are conventionally prepared from maple wood and each such object has to be cut (by hand or by machinery) from an individual block of wood. The advantages which would flow from the development of a polyurethane rigid foam system, which could be molded in the shape of shoe lasts and the like and which would give an object having all the desirable properties of traditional materials used in this art, will be readily apparent to one skilled in the art.

It is an object of this invention to provide novel rigid polyurethane systems which are useful in the preparation of shoe lasts and the like objects and which possess all the desirable properties of traditional materials such as maple wood currently employed in the art. It is a further object of this invention to provide high density rigid polyurethane foams which are characterized by high flexural strength, a Shore D hardness of at least about 40 even at a temperature of the order of 80° C. and a high degree of dimensional stability on exposure to humid heat.

The novel high density rigid polyurethane foams of the invention comprise the product of reaction, under foam-producing conditions, of:

(a) a polyisocyanate selected from the class consisting of (i) methylenebis(phenyl isocyanate) and (ii) mixtures of polymethylene polyphenyl isocyanates containing from about 35 percent by weight to about 85 percent by weight of methylenebis(phenyl isocyanate);
(b) a polyether polyol having a functionality from 3 to 8 and an equivalent weight from about 50 to about 200; and
(c) a polyester diol having an equivalent weight from about 75 to about 600;

the proportions of components (b) and (c) employed in the foam reaction mix being such that the overall combined functionality of said components is within the range of about 2.5 to about 3.5 and the overall combined equivalent weight of said components is within the range of about 100 to about 175 and the overall ratio of isocyanate to hydroxyl groups being within the range of about 0.90 to about 1.20.

The term "high density rigid polyurethane foams" as used in this specification has the meaning generally attributed thereto in the art and designates rigid polyurethane foams having a density from about 30 pounds per cubic foot to about 50 pounds per cubic foot and even higher. The preferred rigid foams according to the invention are those having a density from about 35 pounds per cubic foot to about 45 pounds per cubic foot.

The novel high density rigid polyurethane foams of the invention are characterized by high flexural strength, a Shore D hardness of at least about 40 at a temperature of 80° C. and a high degree of resistance to deformation on exposure to humid heat. These properties are achieved by reacting the particular polyisocyanates and the particular polyols set forth above in the particular proportions defined and under conditions well-known in the art for the preparation of rigid polyurethane foams. The production of high density rigid polyurethane foams is well-known in the art and is generally accomplished by controlling the amount of blowing agent incorporated into conventional systems and/or by packing. However, it has not previously been suggested that the use of the particular polyisocyanates set forth above in combination with the particular mixture of polyols set forth above would lead to the production of high density polyurethane foams having the desirable properties enumerated above.

The polyisocyanate component of the high density rigid foams of the invention is selected from the class consisting of (i) methylenebis(phenyl isocyanate) and (ii) mixtures of polymethylene polyphenyl isocyanates containing from about 35 percent by weight to about 85 percent by weight of methylenebis(phenyl isocyanate). The polyisocyanate component (i) is inclusive of the pure 4,4'-isomer, i.e. 4,4'-methylenebis(phenyl isocyanate) as well as mixtures of the latter isomer with the corresponding 2,4'-isomer, which mixtures are available commercially and generally contain up to about 10% of the 2,4'-isomer the remainder of the mixture being 4,4'-isomer. Said polyisocyanate component (i) is also inclusive of methylenebis(phenyl isocyanate), either 4,4'-isomer or mixtures of 4,4'-isomer and 2,4'-isomer, which has been treated to convert a minor proportion, generally less than 15% by weight of the starting material, to an artefact of said starting material. For example, the polyisocyanate component (i) can be methylenebis (phenyl isocyanate) which has been converted to a stable liquid at temperatures of about 15° C. and higher [methylenebis(phenyl isocyanate) is normally a solid at ambient temperature and has a melting point of the order of 35 to 42° C.] by heating at about 160° C. to about 250° C. in the presence of from about 0.1% to about 3% of a trialkyl phosphate such as triethyl phosphate. Said heating process can be carried out on a batch or continuous basis and the period for which the heating is carried out varies according to the reaction temperature employed. The conditions of heating time and reaction temperature required to convert any particular batch of methylenebis(phenyl isocyanate) to a stable liquid product can be determined readily by a process of trial and error. Generally speaking such treatments are carried out under such conditions that from about 5% to about 15% of the methylenebis(phenyl isocyanate) originally present as starting material has been converted to an isocyanato-substituted artefact.

Illustrative of other modified methylenebis(phenyl isocyanates) which are embraced by polyisocyanate component (i) above are the products obtained by treating methylenebis(phenyl isocyanate) [either pure 4,4'-isomer or mixtures of the latter with 2,4'-isomer] with a minor portion of a carbodiimide such as diphenylcarbodiimide in accordance, for example, with the procedure described in British Patent 918,454. In accordance with said process a minor proportion of the methylenebis-(phenyl isocyanate) is converted to the corresponding isocyanato carbodiimide and there is obtained a mixture of a major proportion of unchanged starting material and a minor proportion of said isocyanato-substituted carbodiimide.

The polyisocyanate component (ii) which can be employed in the novel compositions of the invention is inclusive of mixtures of polymethylene polyphenyl isocyanates obtained by phosgenation of corresponding mixtures of the corresponding methylene-bridged polyphenyl polyamines. The latter, in turn, are obtained by interaction of formaldehyde, hydrochloric acid and primary aromatic amines, for example, aniline, o-chloroaniline, o-toluidine, and the like using procedures well-known in the art; see for example, U.S. Patents 2,683,730, 2,950,263 and 3,012,008; Canadian Patent 700,026; and German specification 1,131,877. Said polymethylene polyphenyl isocyanates generally contain from about 35 to about 85 percent by weight of polymethylene polyphenyl isocyanates the remainder of said mixture being polymethylene polyphenyl isocyanates of functionality higher than 2.0. The overall average functionality of any particular mixture is, of course, directly related to the proportions of the various polymethylene polyphenyl isocyanates in the mixture. The latter proportions correspond substantially to the proportions of methylene-bridged polyphenylamines in the intermediate mixture of polyamines which is phosgenated to obtain the isocyanate. The desired proportion of methylene-bridged polyphenylamines in said mixture is generally controlled by varying the ratio of aniline, or other aromatic amine, to formaldehyde in the initial condensation. For example, using a ratio of approximately 4 moles of aniline to 1.0 mole of formaldehyde there is obtained a mixture of polyamines containing approximately 85% by weight of methylenedianilines. Using a ratio of approximately 4 moles of aniline to about 2.6 moles of formaldehyde there is obtained a mixture of polyamines containing approximately 35% by weight of methylenedianilines. Mixtures of polyamines containing proportions of methylenedianiline intermediate between these limits can be obtained by appropriate adjustment of the ratio of aniline to formaldehyde.

The average functionality of polyisocyanates prepared from the above types of polyamine varies from a low of about 2.2 for polyisocyanates derived from polyamines containing approximately 85% by weight of methylenedianilines through a value of 2.7 for polyisocyanates derived from polyamines containing approximately 50% by weight of methylenedianilines, to a high of about 3.0 for polyisocyanates derived from polyamines containing about 35% by weight of methylenedianilines.

The polyether polyol component (b) employed in the compositions of the invention can be any of the polyether polyols known in the art which have a functionality from about 3 to about 8 and an equivalent weight from about 50 to about 200. Illustrative of such polyether polyols are the adducts of alkylene oxides such as ethylene oxide, propylene oxide, 1,2-butylene oxide and the like, or mixtures of two or more such oxides, and polyhydric alcohols containing from about 3 to about 8 hydroxyl groups such as glycerol, trimethylolpropane, 1,2,6-hexanetriol, sorbitol, arabitol, sucrose, mannitol, pentaerythritol, alkyl glycosides such as methyl, ethyl and the like alkyl arabinosides, xylosides, fructosides, glucosides, rhamnosides, and the like. Such polyether polyols and methods for their preparation are well-known in the art. If desired, a combination of two or more such polyether polyols can be employed as the polyether polyol component (b) of the invention. Component (b) of the compositions of the invention preferably has an overall functionality from about 3 to about 4 and equivalent weight from about 80 to about 100.

The polyester diol component (c) of the compositions of the invention is a difunctional polyester polyol prepared by reacting an excess of a diol, preferably an aliphatic diol with from about 2 to about 10 carbon atoms in the aliphatic chain thereof, with a dicarboxylic acid which is preferably saturated and has no functional groups containing active hydrogen atoms other than the carboxylic acid groups. Illustrative of the dicarboxylic acids which can be employed to prepare said polyester diols are oxalic, malonic, succinic, glutaric, adipic, pimelic and sebacic acids. In place of the free acids the corresponding anhydrides can be used in the actual preparation of the polyesterdiols. Illustrative of the diols which can be used in the preparation of the polyester diols are ethylene glycol, propylene glycol, diethylene glycol, dipropylene glycol, 1,2-butanediol, 2,3-butanediol, 1,4-butanediol, 1,5-pentanediol, 1,6-hexanediol, 1,8-octanediol, and the like, as well as mixtures of two or more such diols.

The use of a combination of the polyether polyol component (b) and the polyester diol component (c) is essential in order to obtain the desired properties (as set forth aboe) in the resulting high density rigid polyurethane foam. The components (b) and (c) are the only polyol components employed in preparing the compositions of the invention. The proportions in which said components (b) and (c) are used are such that the overall combined functionality of said components is within the range of about 2.5 to about 3.5 and the overall combined equivalent weight of said components is within the range of about 100 to about 140.

In preparing the high density rigid foams of the invention the reaction of the polyisocyanate components (a) and the polyol components (b) and (c) is carried out in accordance with procedures well-known in tne art using either the one-shot or prepolymer methods. In the prepolymer method the polyisocyanate component is reacted with a portion of the polyol components (b) and (c) which latter have preferably been blended before reaction. The isocyanate-terminated prepolymer so obtained is subsequently reacted with unused polyol component in the presence of water or a mixture of water and a second blowing agent as discussed hereinafter. Preferably the high density rigid foams of the invention are prepared by the one-shot procedure in which the whole of the polyisocyanate and polyols are brought together in the presence of suitable blowing agents, catalysts and any other adjuvants conventionally used in the preparation of polyurethane foams of this type.

Advantageously the overall ratio of isocyanate groups to hydroxyl groups in the foam reaction mix lies within the range of about 0.90 to about 1.20 and preferably within the range of about 1.03 to about 1.07.

The foam ingredients are brought together and mixed using conventional procedures and apparatus such as mechanical blenders, mixing chambers and the like, and the foam mix is transferred to the appropriate mold or cavity to be filled. If desired, one or more components of the foam mix can be preheated before mixing takes place.

The blowing agents employed in preparing the compositions of the invention can be water (to produce carbon dioxide by reaction with the polyisocyanate) or an aliphatic hydrocarbon or halogenated hydrocarbon having a boiling point below about 110° C. and preferably below about 50° C. or a combination of water and the said aliphatic hydrocarbon or halogenated hydrocarbon. Examples of hydrocarbons and halogenated hydrocarbons which can be employed in this manner are propane, butane, hexane, octane, trichloromonofluoromethane, dichlorodifluoromethane, chlorotrifluoromethane, 1,1-dichloro-1-fluoroethane, 1-chloro-1,1-difluoro-2,2-dichloroethane and 1,1,1-trifluoro-2-chloro-2-fluorobutane or mixtures of two or more such compounds. Preferably water alone is used as blowing agent in preparing the high density rigid foams of the invention.

The amount of blowing agent employed and degree of packing control the final density of the resulting foam and, in order to produce foams of the desired high density, the amount of blowing agent employed is relatively small in weight compared with the other components of the foam mix. Indeed the amount of blowing agent is so small that the moisture content of the polyol components becomes important and has to be taken into account in calculating the amount of blowing agent to be added to the mixture. The calculation of the amount of blowing agent to be used in order to achieve any desired foam density in the subsequent foam can be made in accordance with procedures well-known in the art. In the case of the use of water as the only blowing agent the total amount of water present in the reaction mix, including the original water content of the polyol components, is between about 0.03% by weight to about 0.30% by weight based on polyols in order to produce a resultant foam having a density within the range of about 35 lbs. per cu. ft. to about 45 lbs. per cu. ft.

The catalysts employed in the preparation of the foams in accordance with this invention can be any of those conventionally employed in the art to catalyze the reaction of an isocyanate with a reactive-hydrogen containing compound; see, for example, Saunders et al. Polyurethanes, Chemistry and Technology, vol. I, pp. 227-232, Interscience Publishers, New York, 1964, and Britain et al., J. Applied Polymer Science 4, 207-211, 1960. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium as well as phosphines and tertiary organic amines. The preferred catalysts for use in the process and compositions of the invention are the tertiary organic amines of which the following are representative:

triethylamine,
triethylenediamine,
N,N,N',N'-tetramethylethylenediamine,
N,N,N',N'-tetraethylethylenediamine,
N-methylmorpholine,
N-ethylmorpholine,
1,1,3,3-tetramethylguanidine,
N,N,N',N'-tetramethyl-1,3-butanediamine,
N,N-dimethylethanolamine,
N,N-diethylethanolamine, and the like.

The amount of catalyst employed in the process of the invention is generally of the order of about 0.10 to about 0.60% by weight based on the total weight of ingredients present in the foam mix, though amounts of catalyst outside this range can be used, if desired, for particular systems.

Optional additives such as dispersing agents, cell stabilizers, surfactants, flame retardants, and the like which are commonly employed in the fabrication of rigid polyurethane foams, can be employed in the process of the invention. Thus a finer cell structure may be obtained if water-soluble organosilicone polymers are used as surfactants. Organosilicone polymers obtained by condensing a polyalkoxy polysilane with the monoether of a polyalkylene ether glycol in the presence of an acid catalyst are representative of those surfactants which can be used for this purpose. The organosilicone polymer available under the trade name L-5320 is typical of such polymers. Other surfactants such as ethylene oxide modified sorbitan monopalmitate or ethylene oxide modified polypropylene ether glycol may be used, if desired, to obtain better cell structure and uniformity of the foam.

The high density rigid polyurethane foams produced in accordance with this invention are characterized by a density of about 35 lbs. per cu. ft. to about 45 lbs. per cu. ft.; by high flexural strength, i.e. when tested in accordance with ASTM-D-790-63 (specimen size 6"x½"x½") they are capable of supporting a maximum load of at least 90 lbs., the work needed to achieve this maximum load being not less than 20 inch lbs: a Shore D hardness of at least 70 at room temperature (25° C.) which does not fall below a value of at least 47D at elevated temperature (80° C.); and a high resistance to humid heat conditions, i.e. showing a volume change of less than 0.1% when exposed to 158°±2° F. and 100% relative humidity for 72 hours in accordance with ASTM 2126-62T.

The above physical properties of the high density rigid polyurethane foams produced in accordance with the present invention make said foams useful in a variety of applications enumerated above. A purpose for which the high density foams of the invention are particularly suitable because of the above physical properties is in the fabrication of shoe lasts. The hardness and flexural strength of the high density rigid foams of the invention enables them to withstand the sharp blows involved in the nailing operations of shoe operation while the high structural strength and resistance to humid heat conditions enables shoe lasts fabricated from the foams of the invention to withstand the pressure and distortive forces exerted upon the lasts when the leather, after steaming, is made to shrink upon the last in the heat setting cycle involved in the forming of shoe uppers. Further, the structural strength of said shoe lasts enables them to be machined, fitted with spring loaded hinge plates, and with steel plate reinforcements for the heels, and generally submitted to the various mechanical processes involved in preparing a finished shoe last.

In addition shoe lasts of the desired shape, size, and density can be prepared readily by use of the appropriate mold and by choice of the appropriate foam reaction mix. If desired, the formation of the foam can be allowed to take place under free rise conditions by leaving the top of the mold open. Alternatively, the foaming can be carried out under conditions known in the art as "packing." Using this procedure the mold is generally closed by means of a plate or baffle which is vented to allow gases to escape from the mold but which prevents the seepage of foam mix from the mold. In general the amount of foam-mix placed in such a mold is from about 5 to 10% greater than that which would fill the mold with finished foam under free rise conditions. The density of the foam produced when "packing" is employed is accordingly greater than that produced by the same foam mix under free rise conditions and hence appropriate allowance is made when calculating the proportions of reactants and blowing agent needed to produce a foam of any required density.

In addition to their use as shoe lasts, the novel high density polyurethane foams of the invention can also be used for a variety of purposes which will be obvious to one skilled in the art. For example, the novel high density foams of the invention can be used in the fabrication of bowling balls, bowling pins, children's toys, structural members for use in the building and allied industries, house hold furniture and accessories, and the like.

The following examples describe the manner and process of making and using the invention and set forth the best mode contemplated by the inventors of carrying out the invention but are not to be construed as limiting.

Example 1

A high density rigid polyurethane foam was prepared in accordance with the invention as follows. A mixture of 50 parts by weight of L12–17 [poly(diethylene glycol) adipate, equivalent weight 250], 50 parts by weight of a trimethylolpropane-ethylene oxide adduct (prepared using 1 equivalent of ethylene oxide for each hydroxyl equivalent of trimethylolpropane; equivalent weight 89), 0.1 part by weight of water, 0.2 part by weight of DC–201 (organosilicone surfactant), 0.2 part by weight of N,N,N',N'-tetramethyl-1,4-butanediamine, and 0.3 part by weight of triethylamine was prepared by mechanical mixing. To the resulting mixture was added rapidly, with high speed stirring, 117 parts by weight of modified methylenebis(phenyl isocyanate) [equivalent weight 143: prepared by heating methylenebis(phenyl isocyanate) containing 94% 4,4'-isomer and 6% 2,4'-isomer with 3% by weight of triethylphosphate at 220° C. for 3 hours before cooling to approximately 70° C.] and the foam mix so obtained was poured as rapidly as possible into an aluminum filled epoxy mold for a shoe last of a size sufficient to enable a finished shoe last (size 7½ shoe) to be prepared therefrom. The mold was completely closed except for vent holes. After foaming was complete the resulting foam was aged for 7 days at room temperature (approximately 20° C.) and was found to have the following properties:

Overall density: 45 pounds per cu. ft.
Core density: 39.4 pounds per cu. ft.
Hardness Shore D 25° C.: 80
Hardness Shore D 55° C.: 60
Hardness Shore D 80° C.: 50
Flexural strength (ASTM D–790–63):
    Max. load: 92 pounds
    Work needed to achieve maximum load: 28.3 inch lbs.

Using exactly the procedure and foam mix ingredients set forth above a second rough shoe last was prepared which was cured as described above and then finished in the form of a size 7½ men's shoe, fitted with the conventional spring loaded hinge, steel plate heel reinforcement and mounting bracket. The last so obtained was then placed in a shoe assembly production line and used in the fabrication of leather shoes. After being used for about 35 times the last was examined and found to be in excellent condition.

Example 2

A high density rigid polyurethane foam was prepared in accordance with the invention as follows.

A mixture of 50 parts by weight of L12–17, 50 parts by weight of a trimethylolpropane-ethylene oxide adduct (prepared using 1 equivalent of ethylene oxide for each hydroxyl equivalent of trimethylolpropane; equivalent weight 89), 0.15 part by weight of water, 0.2 part by weight of N,N,N',N'-tetramethyl-1,4-butanediamine, 0.4 part by weight of triethylamine and 0.2 part by weight of DC–201, was prepared by mechanical mixing. To the resulting mixture was added rapidly, with high speed stirring, 109.5 parts by weight of PAPI® (polymethylene polyphenyl isocyanate; equivalent weight 133) and the resulting mixture was poured as rapidly as possible into the aluminum filled epoxy mold for a shoe last described in Example 1. The resulting foam was cured at room temperature (ca. 20° C.) for 7 days and found to have the following physical properties which indicated its usefulness as a shoe last.

Overall density: 46 lbs. cu. ft.
Hardness, Shore D at 25° C.: 78
Flexural strength (ASTM D–790–63):
    Max. load: 110 lbs.
    Work needed to achieve maximum load: 23.5 inch lbs.

Example 3

A high density rigid polyurethane foam was prepared in accordance with the invention as follows. A mixture of 60 parts by weight of a trimethylolpropane-ethylene oxide adduct (prepared using 1 equivalent of ethylene oxide for each hydroxyl equivalent of trimethylolpropane; equivalent weight 89), 40 parts by weight of L12–17, 0.17 part by weight of water, 0.2 part by weight of DC–201, 0.2 part by weight of N,N,N',N'-tetramethyl-1,4-butanediamine, and 0.2 part by weight of triethylamine was prepared by mechanical mixing. To the resulting mixture was added rapidly, with high speed stirring, 117 parts by weight of Carwinate® 390P (polymethylene polyphenyl isocyanate; isocyanate equivalent 130) and the resulting mixture was poured as rapidly as possible into the shoe last mold described in Example 1. After curing the resulting foam as described in Example 1 the last was finished as described in Example 1 and installed on a leather shoe production line. After being used about 35 times the last showed no signs of deterioration or breakage.

Using the procedure set forth above but replacing the polyester diol L12–17 by an equivalent proportion of a poly(diethylene azelate)diol, equivalent weight of 250, a poly(diethylene sebacate) diol, equivalent weight of 250 or a diol of equivalent weight 250 made by esterifying adipic acid with an excess of a mixture of 90 parts by weight of ethylene glycol and 10 parts by weight of propylene glycol, and/or replacing the trimethylolpropane-ethylene oxide adduct by an equivalent proportion of a trimethylolpropane-propylene oxide adduct or a glycerol-propylene oxide adduct, there are obtained high density rigid polyurethane foams having comparable high flexural strength and hardness.

We claim:
1. A rigid polyurethane foam having a density within the range of about 30 pounds per cubic foot to about 50 pounds per cubic foot which comprises the product of reaction, under foam producing conditions, of:
   (a) a polyisocyanate selected from the class consisting of (i) methylenebis(phenyl isocyanate) and (ii) mixtures of polymethylene polyphenyl isocyanates containing from about 35 percent by weight to about 85 percent by weight of methylenebis(phenyl isocyanate);
   (b) a polyether triol having an equivalent weight of about 50 to about 200 selected from the class consisting of trimethylolpropane-ethylene oxide adduct, trimethylolpropane-propylene oxide adduct and glycerol-propylene oxide adduct; and
   (c) a polyester diol having an equivalent weight from about 75 to about 600 selected from the class consisting of poly(diethylene glycol) adipate, poly(diethylene azelate)diol, poly(diethylene sebacate)diol and the diol obtained by esterifying adipic acid with a mixture of 90 parts by weight of ethylene glycol and 10 parts by weight of propylene glycol; the proportions of components (b) and (c) employed in the foam reaction mix being such that the overall combined functionality of said components is within the range of about 2.5 to about 3.5 and the overall combined equivalent weight of said components is within the range of about 100 to about 175, and the overall ratio of isocyanate to hydroxyl groups in said foam reaction mix is within the range of about 0.90 to about 1.20.

2. A shoe last fabricated from a high density rigid polyurethane foam as claimed in claim 1.

References Cited
UNITED STATES PATENTS 3,228,048    1/1966    Tusa et al.    12—133
3,288,732    11/1966    Chapman et al.    260—2.5

DONALD E. CZAJA, Primary Examiner

M. B. FEIN, Assistant Examiner

U.S. Cl. X.R.

12—133; 260—75, 77.5; 273—63